United States Patent

Ishikawa

[11] Patent Number: 5,918,508
[45] Date of Patent: Jul. 6, 1999

[54] STRAIN WAVE GEARING HAVING A NON-INTERFERING WIDE MESH RANGE TOOTH PROFILE

[75] Inventor: Shoichi Ishikawa, Kanagawa-ken, Japan

[73] Assignee: Harmonic Drive Systems, Inc., Tokyo, Japan

[21] Appl. No.: 08/875,382

[22] PCT Filed: Dec. 13, 1996

[86] PCT No.: PCT/JP96/03645

§ 371 Date: Sep. 24, 1997

§ 102(e) Date: Sep. 24, 1997

[87] PCT Pub. No.: WO97/22818

PCT Pub. Date: Jun. 26, 1997

[30] Foreign Application Priority Data

Dec. 15, 1995 [JP] Japan ................................. 7-326848

[51] Int. Cl.⁶ ............................................. F16H 1/32
[52] U.S. Cl. ......................... 74/640; 74/462; 475/904; 475/180
[58] Field of Search ........................ 74/640, 462, 457; 475/162, 170, 177, 180, 904

[56] References Cited

U.S. PATENT DOCUMENTS

| | | |
|---|---|---|
| 2,906,143 | 9/1959 | Musser . |
| 4,817,457 | 4/1989 | Carlson ..................................... 74/640 |
| 5,456,139 | 10/1995 | Aubin ..................................... 74/462 X |
| 5,458,023 | 10/1995 | Ishikawa et al. ........................... 74/640 |
| 5,485,766 | 1/1996 | Ishikawa ..................................... 74/640 |
| 5,662,008 | 9/1997 | Aubin et al. ........................ 475/162 X |
| 5,715,732 | 2/1998 | Takizawa et al. .................. 475/180 X |
| 5,782,143 | 7/1998 | Ishikawa ..................................... 74/640 |

FOREIGN PATENT DOCUMENTS

| | | |
|---|---|---|
| 45-41171 | 12/1970 | Japan . |
| 62-75153 | 4/1987 | Japan . |
| 63-115943 | 5/1988 | Japan . |
| 2-62461 | 3/1990 | Japan . |
| 4-277354 | 10/1992 | Japan . |
| 5-172195 | 7/1993 | Japan . |
| 5-172196 | 7/1993 | Japan . |
| 5-209655 | 8/1993 | Japan . |
| 7-167228 | 7/1995 | Japan . |

*Primary Examiner*—Dirk Wright
*Assistant Examiner*—Peter T. Kwon
*Attorney, Agent, or Firm*—Burns, Doane, Swecker & Mathis LLP

[57] ABSTRACT

A strain wave gearing is provided with tooth profiles formed taking into account tooth inclination and change in the movement locus of the origin of the tooth profile coordinates, thereby obtaining proper meshing over a wide range. Specifically, a tooth module is denoted as m; the number of teeth of the rigid internal gear as $z_C$; the number of teeth, the deddendum, the thickness of the tooth bottom rim and the radius of the neutral circle of the rim of the flexible external gear as $z_F$, $h_{fF}$, t and $r_n$, respectively; the coefficient of tooth thickness increase of the rigid internal gear and the coefficient of tooth thickness decrease of the flexible external gear both as $\tau$; and an auxiliary angle variable $\eta$. The basic addendum profiles of both gears are formed according to two equations, taking an x-axis on a datum line and a y-axis on the tooth center line and taking ± of the first equation as positive for the flexible external gear and as negative for the rigid internal gear.

9 Claims, 8 Drawing Sheets

Fig. 6
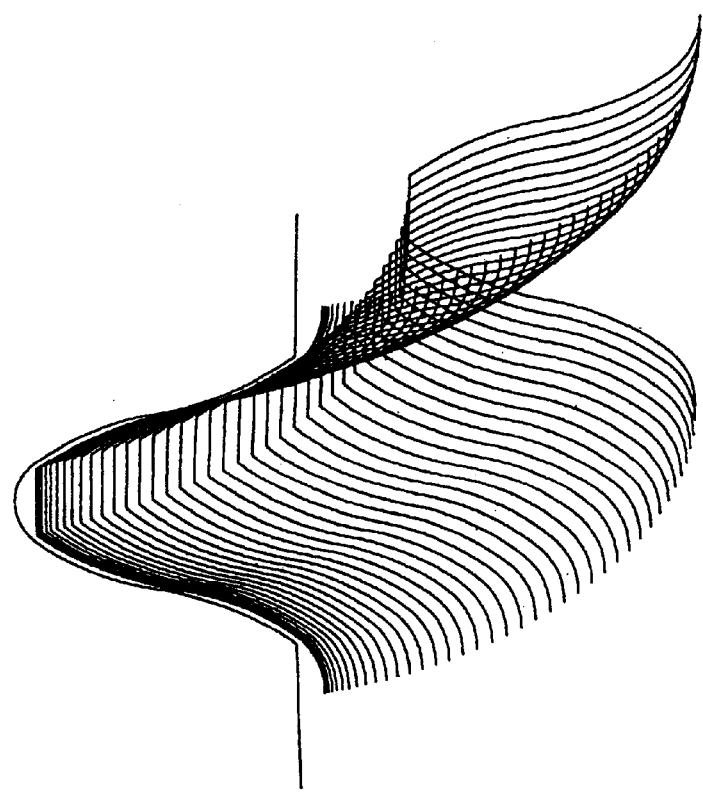
(a)
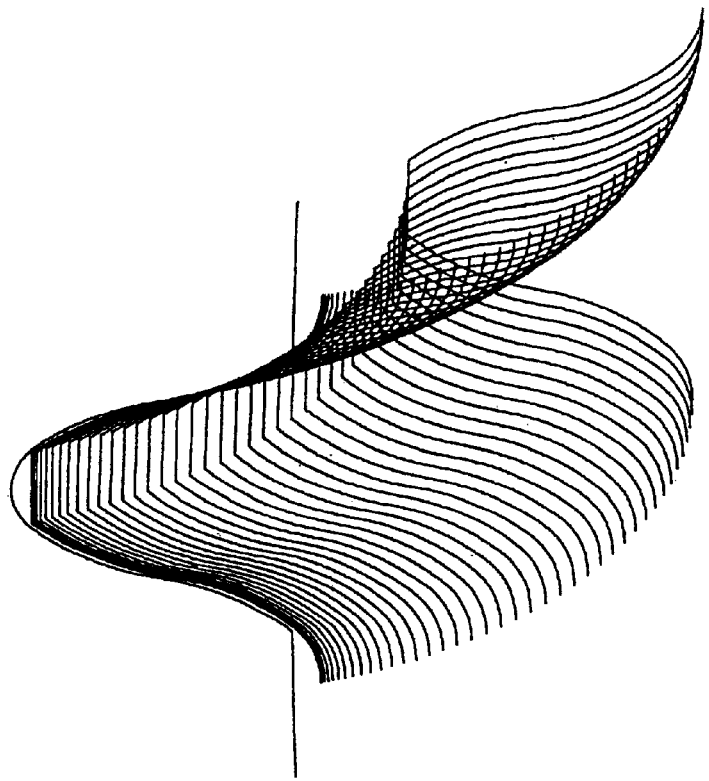
(b)

STRAIN WAVE GEARING HAVING A NON-INTERFERING WIDE MESH RANGE TOOTH PROFILE

BACKGROUND OF THE INVENTION

1. Field of the Invention

This invention relates to a strain wave gearing. More particularly, this invention relates to the tooth profiles of a rigid internal gear and a flexible external gear used in a strain wave gearing.

2. Background Art

A strain wave gearing typically consists of a rigid circular internal gear, a flexible external gear which has 2n fewer teeth than the internal gear and which is disposed inside the internal gear and flexed into an elliptical shape so as to mesh with the internal gear at, for example, two places, and a wave generator fitted inside the external gear for flexing it into an elliptical shape.

Although the tooth profiles of the gears of early strain wave gearings were linear (see U.S. Pat. No. 2,906,143), the present inventor demonstrated the possibility of using involute gears (see JP-B 45-41171). In addition, for increasing load capacity, the inventor proposed a system using as the tooth face profiles of both gears the curve obtained by similarity transforming the movement locus, at a reduction ratio of ½, over a prescribed range from the meshing limit point on the locus based on the rack approximation of the tooth of the external gear relative to the internal gear (JP-A 63-115943). This is a system for obtaining continuous contact between the tooth profiles of the tooth faces of both gears.

Based on studies of the three-dimensional phenomenon called coning in which the insertion of the elliptical wave generator causes the amount of deflection (half the difference between the major and minor axes of the ellipse) to gradually increase from the diaphragm side toward the end of a cup-shaped or silk-hat-shaped flexible external gear approximately in proportion to the distance from the diaphragm, the inventor developed strain wave gearings enabling a wide mesh range, without interference, over the entire tooth trace of the cup-shaped flexible external gear. These devices are described, for example, in JPA 5-172195, JPA 5-172196 and JPA 5-209655.

Other improved tooth profiles are proposed in, for example, JP-A 62-75153, JP-A 2-62461 and JP-A 7-167228. Among these, JP-A 7-167228 is of particular interest in that it utilizes tooth inclination to eliminate tooth profile interference.

The performance being demanded of strain wave gearings is becoming increasingly sophisticated. To respond to this demand, it is necessary to further improve device strength, rigidity and wear resistance.

Further consideration must be given to the tooth profile to achieve these improvements. The basic tooth profiles derived from the movement locus obtained by rack approximation must also be considered in light of the fact that some degree of tooth inclination and change in tooth movement locus arise in the case of finite teeth. The invention set out in the aforesaid JP-A 7-167228 ('228) is an improvement that focuses on tooth inclination to eliminate tooth interference.

However, the '228 invention does not sufficiently analyze tooth inclination and, moreover, gives no consideration to change in tooth movement locus. Thus while the '228 invention succeeds in avoiding tooth interference, it fails to maintain the feature to which the basic tooth profiles are directed, namely, the ability to achieve a wide mesh range. The reasons for this are that while it defines the tooth center line of the flexible external gear as the normal of the neutral curve (located substantially at the center of the tooth bottom rim of the flexible external gear and not contracted or expanded by deflection) and takes the angle between this normal and the radial line into account, it does not take into account the angle between this normal and the tooth space center line (the true tooth inclination angle), and further that it does not take in to account the fact that the movement locus of the intersection point between the tooth center line and the neutral curve, i.e., the origin of the coordinate system for motion analysis, differs from that in the case of a rack.

The object of this invention is to provide a strain wave gearing having non-interfering wide mesh range tooth profile wherein tooth inclination and change in the movemen locus of the origin of the tooth profile coordinate system are taken into account with respect to a rack-approximated tooth profile, thereby enabling correct meshing over a wide range.

SUMMARY OF THE INVENTION

This invention achieves this object by fundamentally improving the tooth profiles of the strain wave gearing. Specifically, this invention derives tooth profiles enabling interference-free contact over a wide range by adopting a convex curve simulating the movement locus obtained by rack approximation as the addendum profile of both the rigid internal gear and the flexible external gear and correcting the convex curve in consideration of the inclination of the tooth center line of the flexible external gear with respect to the tooth space center line of the rigid internal gear and the actual movement locus of the tooth in the case of finite teeth.

More specifically, this invention provides a strain wave gearing having non-interfering wide mesh range tooth profile, the device having a rigid internal gear-with internal teeth formed on its inner periphery, a flexible external gear disposed within the rigid internal gear and including a cylindrical body whose one end is open and formed on its outer periphery with external teeth and whose other end is closed by a diaphragm, and a wave generator for flexing a section of the body of the external gear perpendicular to the axis of the body into an elliptical shape such that the amount of flexing increases from the diaphragm side thereof toward the open end side thereof approximately in proportion to distance from the diaphragm and rotating the flexed configuration, rotation of the wave generator producing relative rotation between the rigid internal gear and the flexible external gear, wherein (a) the rigid internal gear and the flexible external gear are both basically spur gears and the number of teeth of the flexible external gear is 2n (n being a positive integer) fewer than that of the rigid internal gear, (b) one section perpendicular to the axis in the tooth trace direction of the flexible external gear is selected as a main section and the amount of radial flexing of the main section is set to the normal amount of deflection (value obtained by dividing the diameter of the pitch circle of the flexible external gear by the speed reduction ratio when the rigid internal gear is fixed) or to the normal amount of deflection plus or minus some adjustment amount, (c) meshing of the flexible external gear and the rigid internal gear is simulated with racks and the curve obtained by similarity transforming the movement locus of the teeth of the racks relative to each other is adopted as the basic addendum profile of both gears, (d) the deviation from the rack-approximated tooth profiles arising in actual meshing is resolved into displacement caused by inclination of the tooth center line of the flexible external gear relative to the tooth space center line of the rigid internal gear and displacement caused by shift of the movement locus of the tooth of the flexible external gear from the rack movement locus and correcting the basic addendum profile of both gears beforehand so that the deviations cancel out, thereby determining the addendum profiles of both gears.

The invention also includes as another feature that (e) the deddendum profile of each of the rigid internal gear and the flexible external gear is formed to a shape matching the tooth profile of the other or to such shape plus a certain amount of clearance.

The invention also includes as another feature that (f) relieving is applied to the external teeth of the flexible external gear from the main section of the flexible external gear toward the open end and the closed end thereof so as to achieve wide-range continuous contact meshing at the main section of the flexible external gear and to achieve continuous contact meshing along the tooth trace from the main section toward the open end and the closed end.

The basic addendum profiles of both gears can be determined as follows.

Defining the tooth module as $\underline{m}$, the number of teeth of the rigid internal gear as $Z_C$; the number of teeth, the deddendum, the thickness of the tooth bottom rim and the radius of the neutral circle of the rim of the flexible external gear as $Z_F$, $h_{fF}$, $\underline{t}$ and $r_n$; the coefficient of tooth thickness increase of the rigid internal gear and the coefficient of tooth thickness decrease of the flexible external gear both as $\tau$; and an auxiliary angle variable as $\eta$, the basic addendum profiles of both gears can be determined from equations (1) and (2). For both equations, the $\underline{x}$ axis is taken on the datum line and the $\underline{y}$ axis on the tooth center line. In equation (1), the $\pm$ is taken as positive for the flexible external gear and as negative for the rigid internal gear.

$$x = m[0.25\{\pi - n(\eta - \sin \eta)\} - (\pm \tau)] - 0.5(g_1 - g_2) \quad (1)$$

$$y = 0.5mn(1 - \cos \eta) \quad (2)$$

where $$g_1 = (0.5\tau + h_{fF} + mn - f)[\tan^{-1}\{2mn \cdot \sin \eta/(r_n + 2mn \cdot \cos \eta)\} + \epsilon]$$

$$g_2 = 0.5mn(\eta - \sin \eta) - x_N + \{y_N - mn(1 - \cos \eta)\} \cdot 0.5 \tan(0.5\eta)$$

$$f = 0.5m[n(1 + \cos \eta) + \tan(0.5\eta)\{0.25(\pi - n(\eta - \sin \eta)) - \tau\}]$$

$$\theta = 0.5\eta - (0.5mn/r_n)\sin \eta + (0.5mn/r_n)^2 \sin(2\eta)$$

$$\epsilon = \theta - 0.5\eta Z_F/Z_C$$

$$x_N = (r_n + mn \cdot \cos(2\theta))\sin \epsilon$$

$$Y_N = r_n + mn - \{r_n + mn \cdot \cos(2\theta)\}\cos \epsilon$$

When the basic addendum profiles of the two teeth have been determined in this manner, it suffices to form the deddendum profile of each of the rigid internal gear and the flexible external gear to a shape matching the addendum profile of the other or to such shape plus a certain amount of clearance.

It is further preferable to impart relieving from the main section toward the open end and the closed end.

BRIEF DESCRIPTION OF THE DRAWINGS

FIG. 6(a) is a diagram for explaining meshing at the main section of the tooth profiles of the invention and FIG. 6(b) is a similar diagram for the tooth profiles according to the invention disclosed in the invention of JP-A 7-167228.

DETAILED DESCRIPTION OF THE PREFERRED EMBODIMENT

The tooth profile formation method of this invention will now be explained with reference to the drawings. The example discussed in the following relates to an embodiment wherein the difference in number of teeth between the flexible external gear and the rigid internal gear is 2n (n being a positive integer) and the shape of the neutral curve of the wave generator is an approximated ellipse obtained by superimposing on a true circle of radius $r_n$ a sine wave having a total amplitude of 2mn ($\underline{m}$ being a module) and a wave length equal to one half the circumference.

Figure 1:
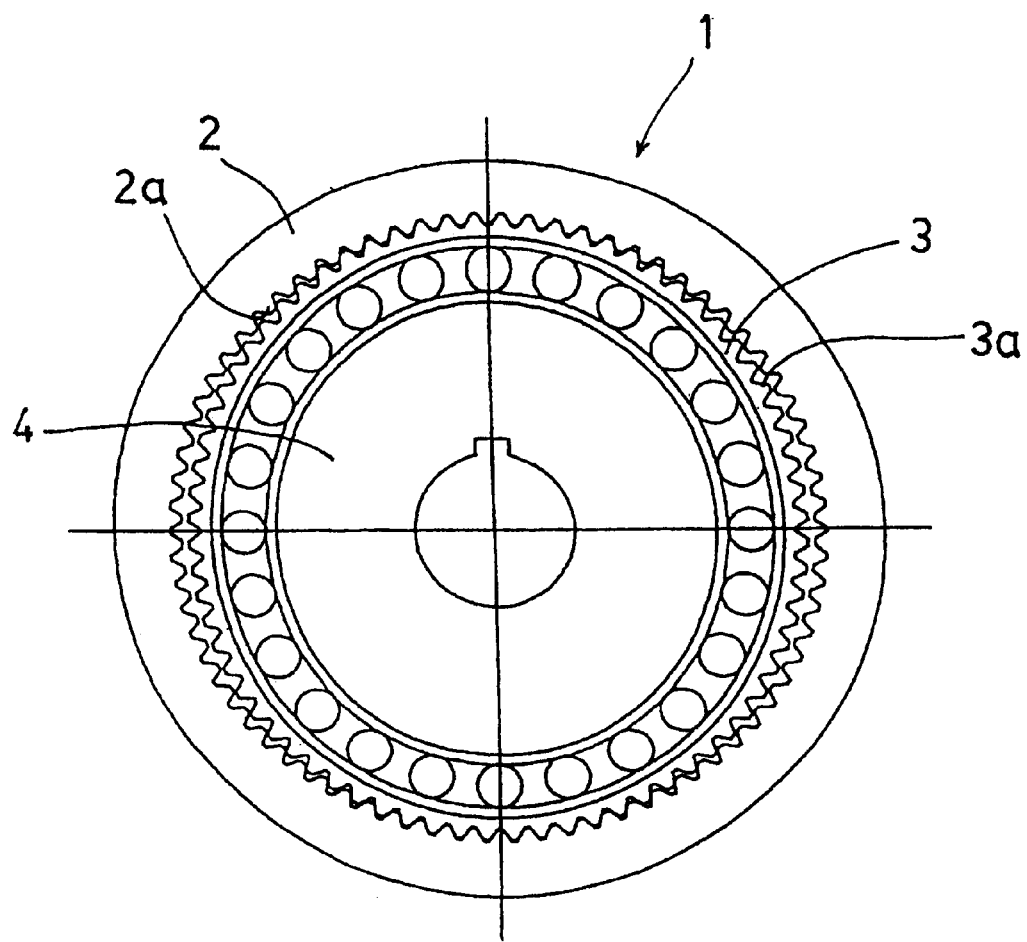
FIG. 1 is schematic front view of an ordinary strain wave gearing.

FIG. 1 is a front view of a well-known strain wave gearing in the case where the difference in number of teeth is 2 (n=1). As shown in this figure, a strain wave gearing 1 has a rigid internal gear 2 formed on its inner periphery with internal teeth 2a, a flexible external gear 3 disposed inside the rigid internal gear 2 and formed on its outer periphery with external teeth 3a, and a wave generator 4 for flexing the external gear 3 into an approximately elliptical shape, causing the external teeth 3a to mesh partially with the internal teeth 2a at positions corresponding to the extremities of the major axis of the elliptical shape and rotating the two mesh positions in the circumferential direction. The rotation of the wave generator 4 produces relative rotation between the rigid internal gear 2 and the flexible external gear 3.

Figure 2:
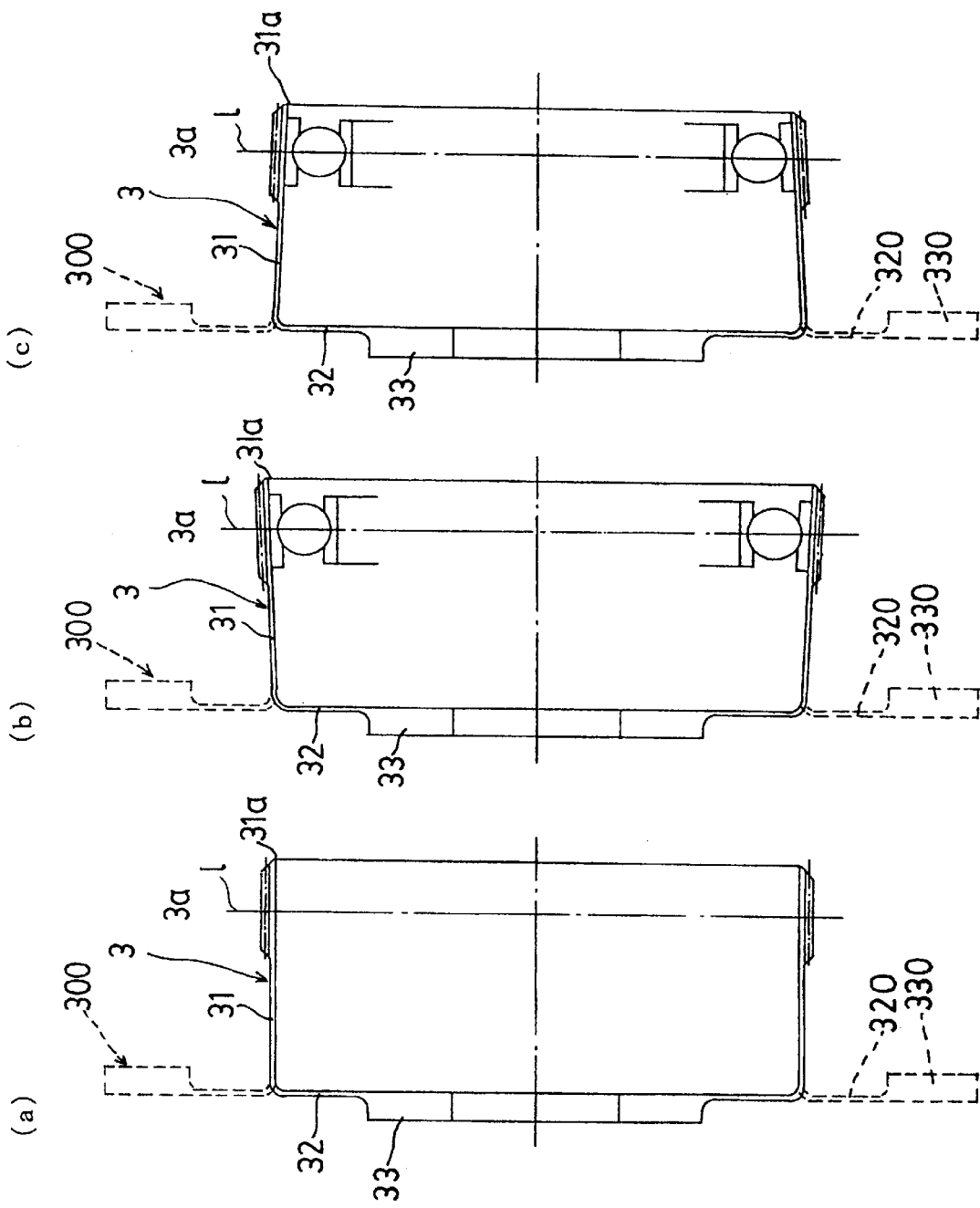
FIG. 2 is a set of diagrams for explaining how a cup-shaped or silk-hat-shaped flexible external gear is flexed by coning, in which (a) is a section through the axis before deformation, (b) is a section through the axis including the major axis of the wave generator, and (c) is a section through the axis including the minor axis.

FIG. 2 is a set of diagrams showing sections of the flexible external gear 3 taken through its axis. The flexible external gear 3, indicated by solid lines, is of a cup-like configuration comprising a cylindrical body 31 whose one end is an open end 31a, a diaphragm 32 closing the other end (closed end) of the cylindrical body 31, and a boss 33 formed integrally with the center of the diaphragm 32. The external teeth 3a are formed on the outer periphery of the cylindrical body 31 on the side of the open end 31a thereof.

Owing to the coning described earlier, the flexible external gear 3 of this configuration is flexed into elliptical shape by the wave generator 4 in such manner that the amount of flexing of sections through the axis of the cylindrical body 31 increases from the diaphragm 32 side toward the open end 31a approximately in proportion to distance from the diaphragm 32.

The configuration of a silk-hat-shaped flexible external gear 300 is shown in broken lines in FIG. 2. In the case of the silk-hat-shaped flexible external gear 300, an annular diaphragm 320 is formed to extend radially outward continuously from one end of the cylindrical body 31 and an annular boss 330 is formed to continue integrally from the outer edge of the diaphragm 320. This invention can also be applied to a strain wave gearing having a silk-hat-shaped flexible external gear 300 of this configuration.

FIG. 2(a) is a section through the axis of the flexible external gear 3 before flexing caused by coning. FIG. (b) is a section through the axis including the major axis of the wave generator 4 showing deflection caused by coning. FIG. (c) is a section through the axis including the minor axis of the wave generator 4 showing the flexing caused by coning. The straight line 1 in the figures indicates main section responsible for the main portion of the meshing. The main section is defined, for example, as the section passing through the center of support by the wave generator 4.

In the method of deriving the tooth profiles of a strain wave gearing according to this invention, the meshing of the teeth is first approximated with racks, the basic tooth profile is derived from the movement locus of the teeth of the racks relative to each other by similarity transformation, and the basic profile is next corrected for the actual finite number of teeth.

Figure 3:
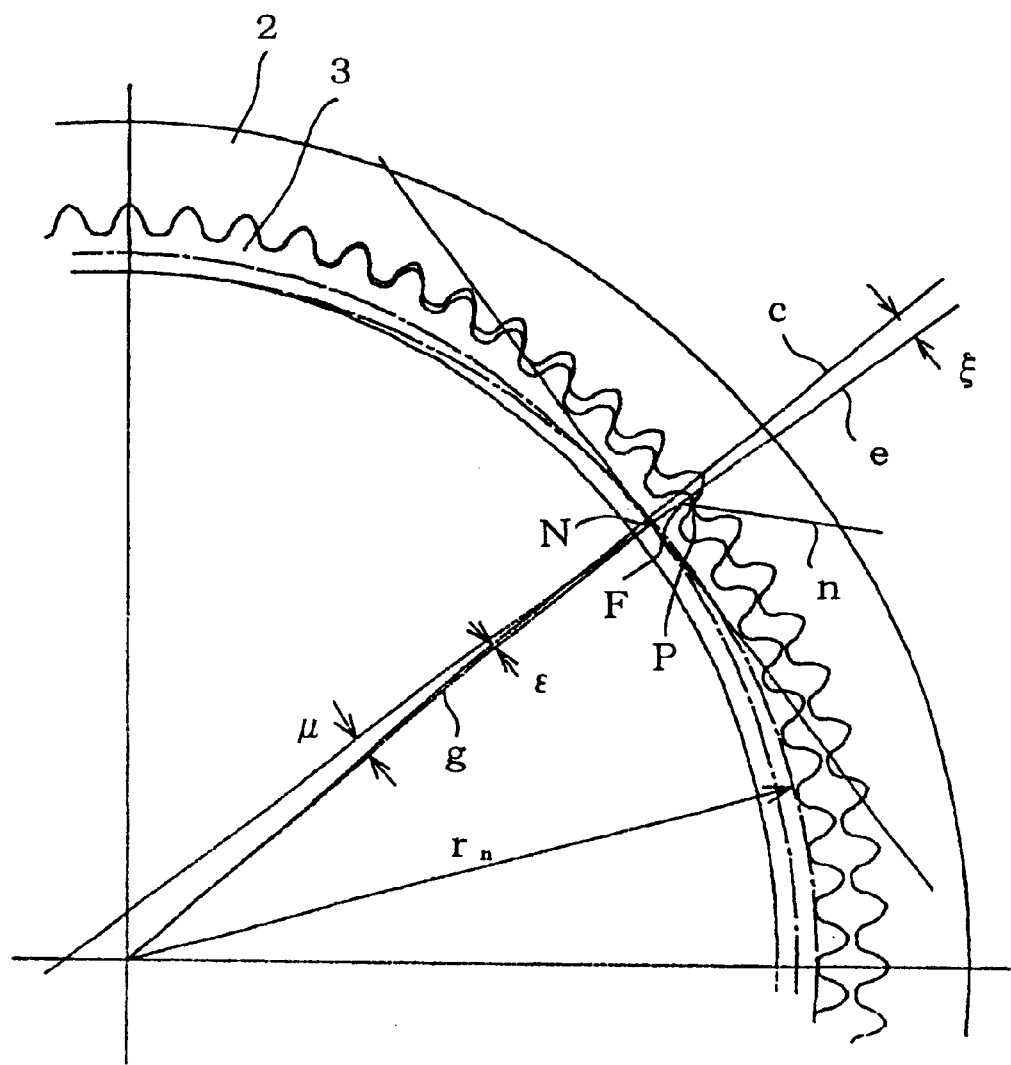
FIG. 3 is a diagram for explaining the positional relationship between the tooth center line of the flexible external gear and the tooth space center line of the rigid internal gear, this being the relationship on which the tooth profile of this invention is based.

FIG. 3 is a diagram for explaining the positional relationship between the tooth center line a of the flexible external gear 3 and the tooth space center line e of the rigid internal gear. The tooth profile of this invention is based on this relationship. The angle $\epsilon$ between the two center lines is given by the following equation (3), using an auxiliary angle variable $\eta$ relating to the position of the tooth profile contact point and an auxiliary angle variable $\theta$ relating to the position of the major axis of the wave generator 4, defining the number of teeth of the rigid internal gear 2 as $Z_C$ and the number of teeth of the flexible external gear 3 as $Z_F$.

$$\epsilon = \theta - 0.5\eta Z_F/Z_C \quad (3)$$

where $$\theta = 0.5\eta - (0.5mn/r_n \sin \eta + (0.5mn/r_n)^2 \sin(2\eta)) \quad (4)$$

The angle $\mu$ between the tooth center line e of the flexible external gear 3 (considered to be coincident with the normal to the neutral curve of the tooth bottom rim) and the radial line g is given by equation (5).

$$\mu = \tan^{-1}\{2mn.\sin \eta/(r_n + 2mn.\cos \eta)\} \quad (5)$$

The angle $\xi$ between the tooth center line e of the flexible external gear 3 and the tooth space center line c of the rigid internal gear 2 is therefore given by equation (6).

$$\xi = \epsilon + \mu \quad (6)$$

Figure 4:
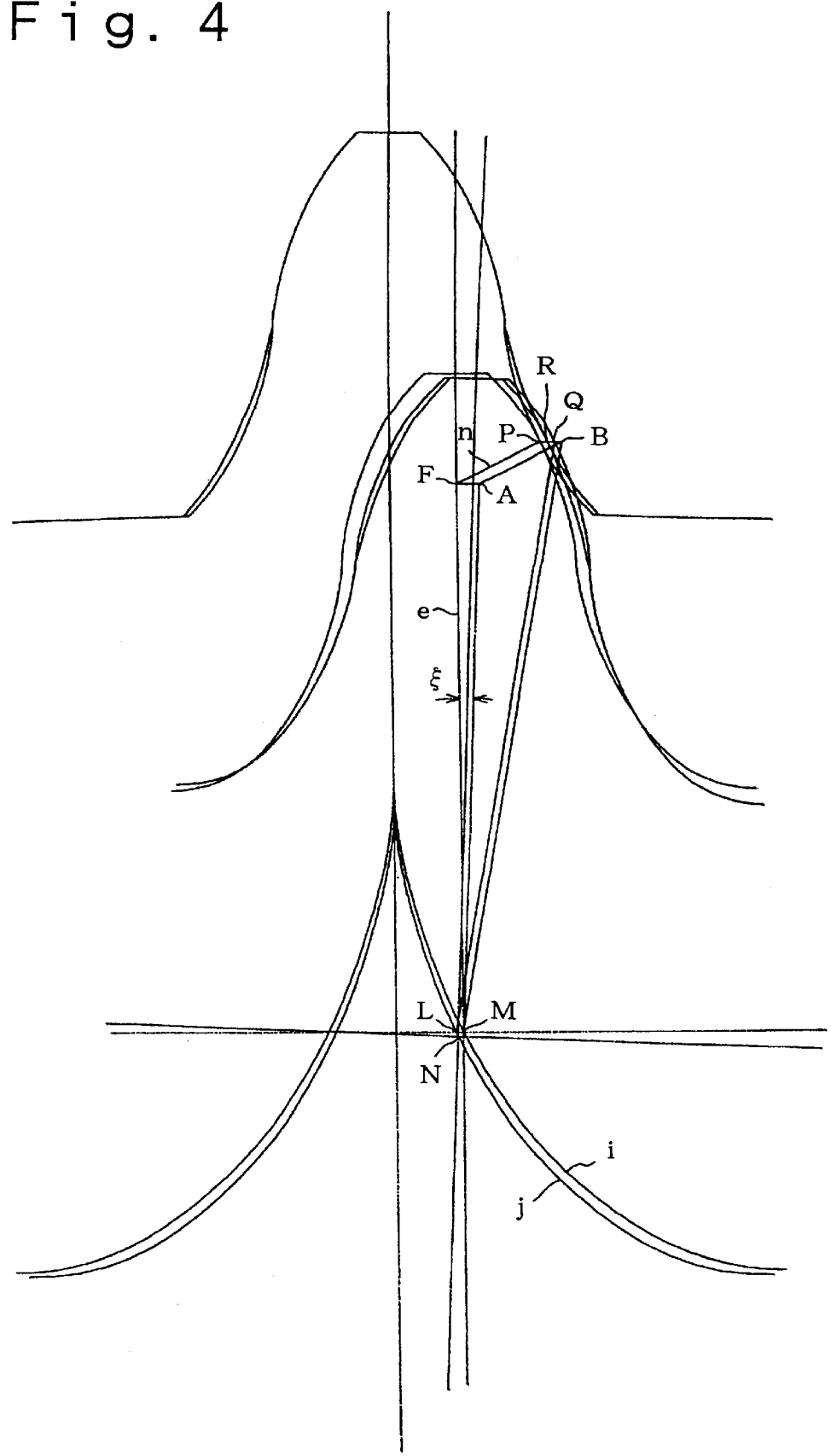
FIG. 4 is a diagram for explaining a method for eliminating the interference of basic tooth profiles derived by rack approximation and thereby deriving tooth profiles capable of proper contact.

FIG. 4 is a diagram for explaining a method for eliminating the interference arising between the basic tooth profiles derived by rack approximation owing to tooth inclination caused by the angle $\xi$ and change in tooth movement locus, thereby by deriving an addendum profile of the flexible external gear enabling proper contact. For this, the tooth thickness is first corrected beforehand by an amount corresponding to the amount of movement of the contact point. Denoting the thickness of the tooth bottom rim of the flexible external gear as $\underline{t}$, its deddendum as $h_{fF}$, and its coefficient of tooth thickness decrease as $\tau$, this amount is given as $g_1$ by equation (7).

$$g_1 = (0.5t + h_{fF} + mn - f)\xi \quad (7)$$

where $$f = 0.5m[n(1+\cos \eta) + \tan(0.5\eta)\{0.25(\pi - n(\eta - \sin \eta)) - \tau\}] \quad (8)$$

Unlike equation (6) according to this invention, the equation for obtaining $\xi$ in the invention of JP-A 7-167228 ('228) mentioned earlier does not give the correct value because it is based solely on $\mu$ and ignores $\epsilon$. In FIG. 4, the amount of correction $g_1$ is the product of $\xi$ and the distance from the origin M of the virtual coordinates of the addendum profile of the flexible external gear 3 in the case of non-deviated rack approximation to the intersection point F between tooth center line e and the normal n to the tooth profile at the virtual contact point P in this case. In other words, it corresponds to the line segments FA and PB. The equation for obtaining f in the invention of '228 does not include second term enclosed between braces on the right side of equation (8) and therefore results in an error of this amount. The reason for the displacement of point P with change in angle $\xi$ around point M being small is that when considered as resolved into displacement of point F in the direction perpendicular to tooth center line e caused by change in angle $\xi$ around point M and displacement of point P in the tooth profile direction caused by change in angle $\xi$ around point F, the situation is such that the latter displacement does not cause a change in the tooth thickness.

It is next necessary to consider the difference between the movement locus i of the origin N of the coordinates and the nondeviated movement locus j in the case of racks. In other words, it is necessary to make a correction taking into account the difference between the coordinates indicating the position of the origin N of the tooth of the flexible external gear 3 relative to the tooth space of the rigid internal gear 2 ($x_N$, $y_N$) and the coordinates of the virtual origin position M in the case of non-deviated racks. In making this correction, the difference in the y direction (tooth height direction) is converted to x-direction difference (tooth thickness difference) using the slope of the movement locus at point N and the result is added to the x-direction difference to increase the tooth thickness by this amount. This correction amount $g_2$ corresponds to ML and BQ in FIG. 4 and is given by equation (9).

$$g_2 = 0.5mn(\eta - \sin \eta) - x_N + \{y_N - mn(1 - \cos \eta)\}.0.5 \tan(0.5\eta) \quad (9)$$

where $$x_N = (r_n + mn.\cos(2\theta))\sin \epsilon \quad (10)$$

$$y_N = r_n + mn - \{r_n + mn.\cos(2\theta)\}\cos \epsilon \quad (11)$$

In addition to the foregoing, a coefficient of tooth thickness decrease $\tau$ for further facilitating deformation of the flexible external gear and reducing stress concentration at the deddendum is introduced. (In the rigid internal gear 2, τ is a coefficient of tooth thickness increase.) The following addendum profile equations (1) and (2) of the two gears according to this invention are obtained upon allotting equal amounts of the correction amount in the tooth thickness direction derived above in the manner of QR and PR in FIG. 4.

$$x = m[0.25\{\pi - n(\eta - \sin \eta)\} - (\pm \tau)] - 0.5(g_1 - g_2) \quad (1)$$

$$y = 0.5mn(1 - \cos \eta) \quad (2)$$

In equation (1), the sign of τ is taken as plus (+) for the flexible external gear and as minus (−) for the rigid internal gear. Further, the deddendum profile of each of the two teeth is formed to a shape substantially matching the addendum profile of the other or to such shape plus a certain amount of clearance.

Figure 5:
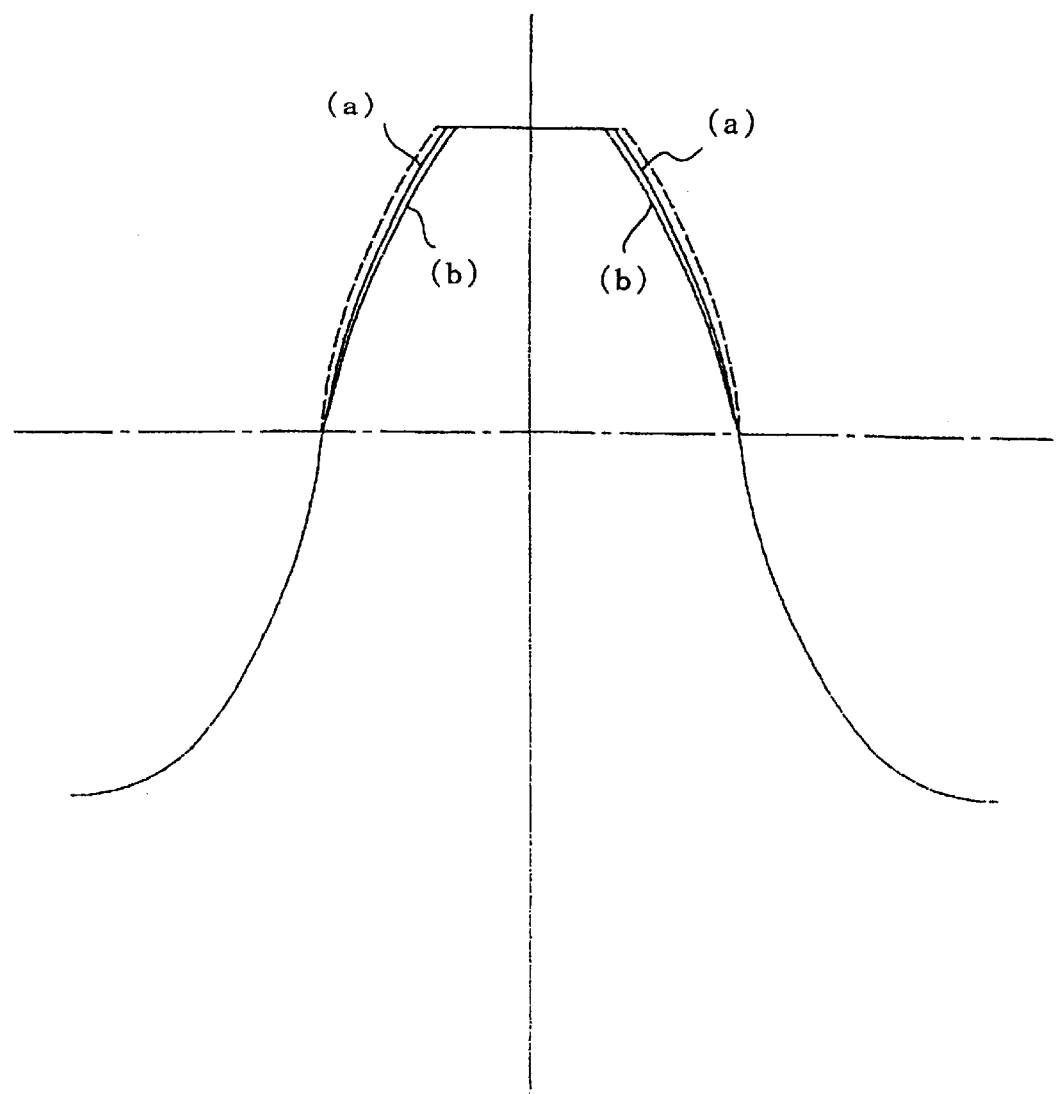
FIG. 5 is a diagram showing a flexible external gear tooth profile according to the method of this invention (curve (a)) and, for reference, a flexible external gear tooth profile formed in accordance with the invention disclosed in the invention of JP-A 7-167228 (curve (b)).

In FIG. 5, (a) designates an example of the tooth profile of the flexible external gear according to the invention method for the case of a tooth number difference of 2 (n=1), while (b) designates the tooth profile formed according to the '228 invention.

FIG. 6 (a) shows an example of the meshing of invention tooth profiles at the main section in the case of a tooth number difference of 2 (n=1) represented as the moving shape of one gear of the flexible external gear relative to one tooth space of the rigid internal gear as followed over the passage of time. FIG. 6(b) shows a similar movement locus obtained in the case of the tooth profile (b) in FIG. 5 formed according to the '228 invention.

Figure 7:
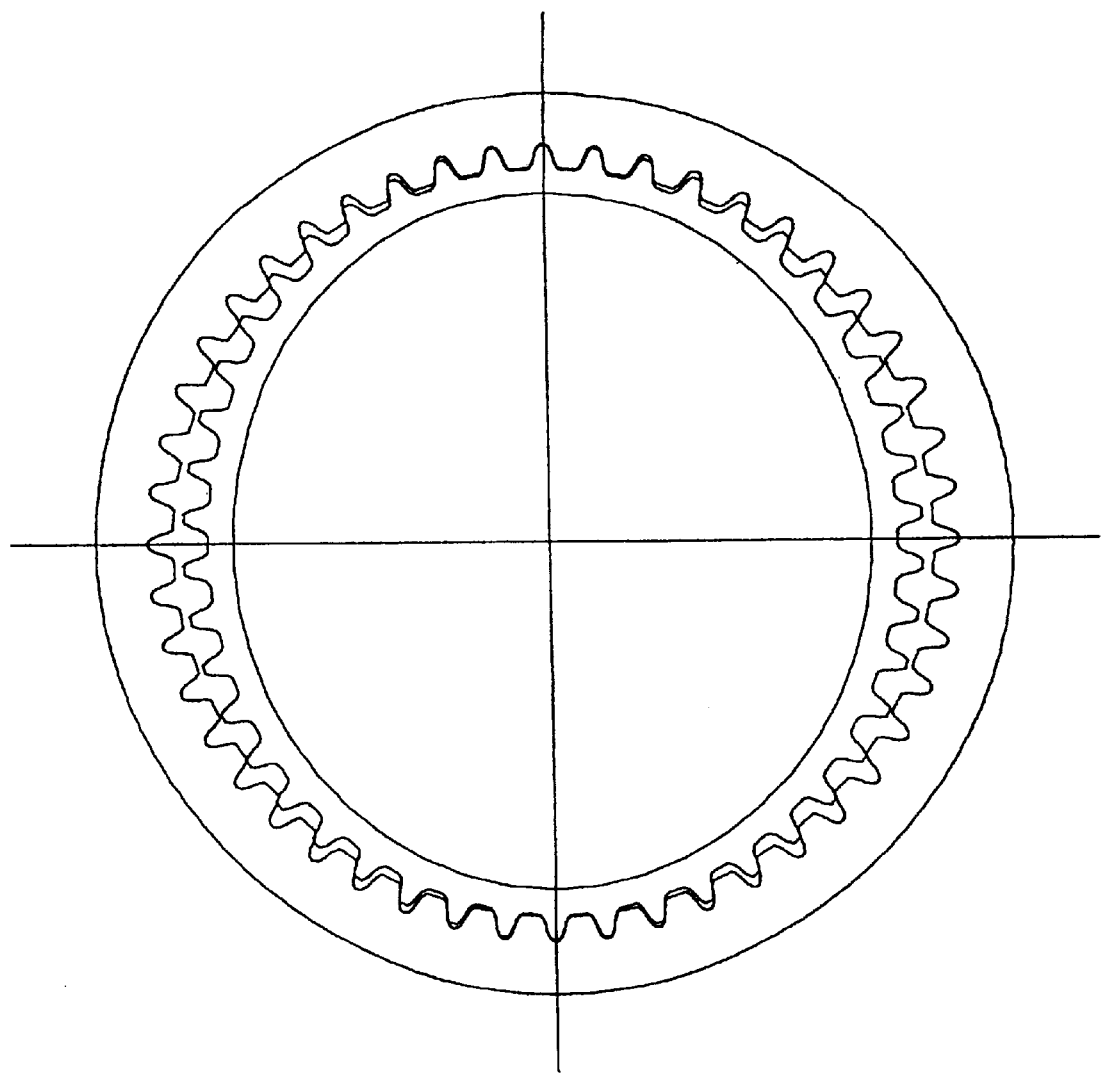
FIG. 7 is an explanatory diagram of the meshing of the tooth profiles of this invention at a main section, drawn spatially over all teeth.

FIG. 7 shows another example of the meshing of the tooth profiles of the invention at the main section in the case of a tooth number difference of 2 (n=1), drawn spatially over all teeth.

Figure 8:
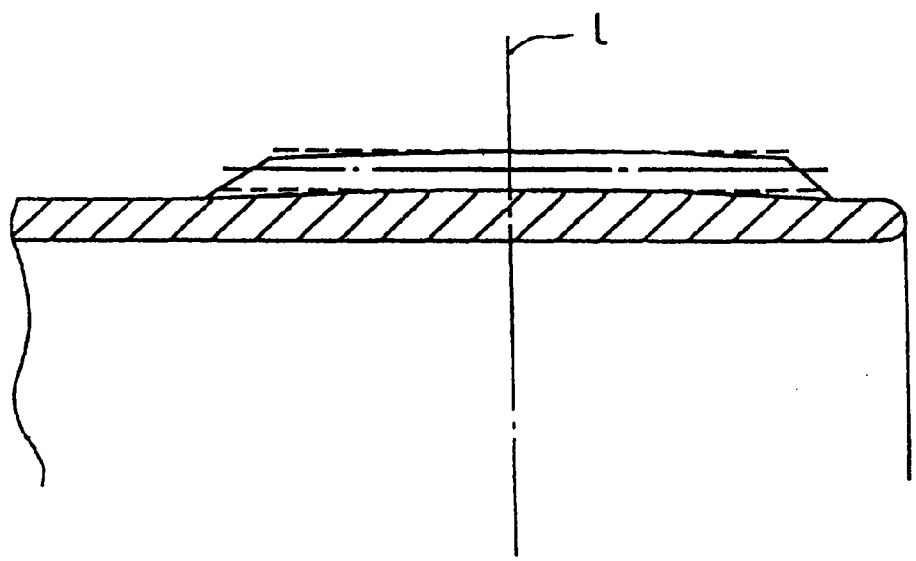
FIG. 8 is a diagram for explaining conventional relieving applied to a tooth.

This invention further avoids tooth profile interference at sections of the flexible external gear other than the main section by applying and adjusting the amount of tooth relieving by a conventional method as shown in FIG. 8 to promote meshing in the tooth trace direction at these portions.

Since the principle of this invention applies at any desired coning angle of a flexible external gear of either cup-shaped or silk-hat-shaped configuration, the invention can also be applied to a flexible external gear having a short body length.

The invention also encompasses the special case of an annular flexible external gear in which coning does not occur.

As explained in the foregoing, the present invention achieves proper wide-range meshing of the addendum profiles of the two gears. It therefore reduces tooth face pressure, increases permissible transmitted torque and enhances meshing rigidity.

What is claimed is:

1. A strain wave gearing having non-interfering wide mesh range tooth profile, the device having a rigid internal gear with internal teeth formed on its inner periphery, a flexible external gear disposed within the rigid internal gear and including a cylindrical body whose one end is open and formed on its outer periphery with external teeth and whose other end is closed by a diaphragm, and a wave generator for flexing a section of the body of the external gear perpendicular to an axis of the body into an elliptical shape such that the amount of flexing increases from the diaphragm side thereof toward the open end side thereof approximately in proportion to distance from the diaphragm and rotating the flexed configuration, rotation of the wave generator producing relative rotation between the rigid internal gear and the flexible external gear, wherein (a) the rigid internal gear and the flexible external gear are both basically spur gears and the number of teeth of the flexible external gear is 2n, n being a positive integer, fewer than that of the rigid internal gear, (b) one section perpendicular to the axis in a tooth trace direction of the flexible external gear is selected as a main section and the amount of radial deflection of the main section is set to a normal amount of deflection value obtained by dividing the diameter of the pitch circle of the flexible external gear by the speed reduction ratio when the rigid internal gear is fixed or to the normal amount of deflection plus or minus a calculated adjustment amount, (c) meshing of the flexible external gear and the rigid internal gear is simulated with racks and a curve obtained by similarity transforming a movement locus of the teeth of the racks relative to each other is adopted as the basic addendum profile of both gears, (d) deviation from the rack-approximated tooth profiles arising in actual meshing is resolved into displacement caused by inclination of the tooth center line of the flexible external gear relative to the tooth space center line of the rigid internal gear and displacement caused by shift of the movement locus of the tooth of the flexible external gear from the rack movement locus and correcting the basic addendum profile of both gears beforehand so that the deviations cancel out, thereby determining the addendum profiles of both gears.

2. A strain wave gearing having non-interfering wide mesh range tooth profile according to claim 1, wherein (e) a deddendum profile of each of the rigid internal gear and the flexible external gear is formed to a shape matching the tooth profile of the other gear or to such shape plus a calculated amount of clearance.

3. A strain wave gearing having non-interfering wide mesh range tooth profile according to claim 2, wherein (f) relieving is applied to the external teeth of the flexible external gear from the main section of the flexible external gear toward the open end and the closed end thereof so as to achieve wide-range continuous contact meshing at the main section of the flexible external gear and to achieve continuous contact meshing along the tooth trace from the main section toward the open end and the closed end.

4. A strain wave gearing having non-interfering wide mesh range tooth profile according to claim 1, wherein a tooth module is denoted as (m); the number of teeth of the rigid internal gear as ($Z_c$); the number of teeth, the deddendum, the thickness of the tooth bottom rim and the radius of the neutral circle of the rim of the flexible external gear as ($Z_f$), ($h_{fF}$), (t) and ($r_n$); the coefficient of tooth thickness increase of the rigid internal gear and the coefficient of tooth thickness decrease of the flexible external gear both as (τ); and an auxiliary angle variable as (η), and basic addendum profile of both gears are formed using equations (1) and (2) taking an x axis on a datum line and a y axis on the tooth center line and taking ± in equation (1) as positive for the flexible external gear and as negative for the rigid internal gear:

$$x = m[0.25\{\pi - n(\eta - \sin \eta)\} - (\pm \tau)] - 0.5(g_1 - g_2) \quad (1)$$

$$y = 0.5mn(1 - \cos \eta) \quad (2)$$

where $g_1 = (0.5t + h_{fF} + mn - f)[\tan^{-1}\{2mn \cdot \sin \eta/(r_n + 2mn \cdot \cos \eta)\} + \epsilon]$ $g_2 = 0.5mn(\eta - \sin \eta) - x_N + \{y_N - mn(1 - \cos \eta)\} \cdot 0.5\tan(0.5\eta)$ $f = 0.5m[n(1 + \cos \eta) + \tan(0.5\eta)\{0.25(\pi - n(\eta - \sin \eta)) - \tau\}]$ $\theta = 0.5\eta - (0.5mn/r_n)\sin \eta + (0.5mn/r_n)^2 \sin(2\eta)$ $\epsilon = \theta - 0.5\eta z_F/z_c$ $x_N = (r_n + mn \cdot \cos(2\theta))\sin \epsilon$ $y_N = r_n + mn - \{r_n + mn \cdot \cos(2\theta)\}\cos \epsilon$ 5. A strain wave gearing having non-interfering wide mesh range tooth profile according to claim 4, wherein a deddendum profile of each of the rigid internal gear and the flexible external gear is formed to a shape matching the addendum profile of the other gear or to such shape plus a calculated amount of clearance.

6. A strain wave gearing having non-interfering wide mesh range tooth profile according to claim 5, wherein relieving is applied to the external teeth from the main section of the flexible external gear toward the open end and the closed end thereof so as to achieve wide-range continuous contact meshing at the main section of the flexible external gear and to achieve continuous contact meshing along the tooth trace from the main section toward the open end and the closed end.

7. A strain wave gearing having non-interfering wide mesh range tooth profile, the device having a rigid internal gear with internal teeth formed on its inner periphery, an annular flexible external gear disposed within the rigid internal gear, and a wave generator for flexing the external gear into an elliptical shape and rotating the flexed configuration, rotation of the wave generator producing relative rotation between the rigid internal gear and the flexible external gear, wherein (a) the rigid internal gear and the flexible external gear are both basically spur gears and the number of teeth of the flexible external gear is 2n, n being a positive integer, fewer than that of the rigid internal gear, (b) the amount of radial deflection of the flexible external gear in a section perpendicular to its axis is set to a normal amount of deflection value obtained by dividing the diameter of the pitch circle of the flexible external gear by the speed reduction ratio when the rigid internal gear is fixed or to the normal amount of deflection plus or minus a calculated adjustment amount, (c) meshing of the flexible external gear and the rigid internal gear is simulated with racks and a curve obtained by similarity transforming a movement locus of the teeth of the racks relative to each other is adopted as the basic addendum profile of both gears, (d) deviation from the rack-approximated tooth profiles arising in actual meshing is resolved into displacement caused by inclination of the tooth center line of the flexible external gear relative to the tooth space center line of the rigid internal gear and displacement caused by shift of the movement locus of the tooth of the flexible external gear from the rack movement locus and correcting the basic addendum profile of both gears beforehand so that the deviations cancel out, thereby determining the addendum profiles of both gears.

8. A strain wave gearing having non-interfering wide mesh range tooth profile according to claim 7, wherein (e) a deddendum profile of each of the rigid internal gear and the flexible external gear is formed to a shape matching the tooth profile of the other gear or to such shape plus a calculated amount of clearance.

9. A strain wave gearing having non-interfering wide mesh range tooth profile according to claim 7, wherein a tooth module is denoted as (m); the number of teeth of the rigid internal gear as ($Z_c$); the number of teeth, the addendum, the thickness of the tooth bottom rim and the radius of the neutral circle of the rim of the flexible external gear as ($Z_F$), ($h_{fF}$), (t) and ($r_n$); the coefficient of tooth thickness increase of the rigid internal gear and the coefficient of tooth thickness decrease of the flexible external gear both as ($\tau$); and an auxiliary angle variable as ($\eta$,) and basic addendum profiles of both gears are formed using equations (1) and (2) taking an x axis on a datum line and a y axis on the tooth center line and taking ± in equation (1) as positive for the flexible external gear and as negative for the rigid internal gear:

$$x = m[0.25\{\pi - n(\eta - \sin \eta)\} - (\pm \tau)] - 0.5(g_1 - g_2) \quad (1)$$

$$y = 0.5mn(1 - \cos \eta) \quad (2)$$

where $g_1 = (0.5t + h_{fF} + mn - f)[\tan^{-1}\{2mn/\sin \eta/(r_n + 2mn \cdot \cos \eta)\} + \epsilon]$ $g_2 = 0.5mn(\eta - \sin \eta) - x_N + \{y_N - mn(1 - \cos \eta)\} \cdot 0.5 \tan(0.5\eta)$ $f = 0.5m[n(1 + \cos \eta) + \tan(0.5\eta)\{0.25(\pi - n(\eta - \sin \eta)) - \tau\}]$ $\theta = 0.5\eta - (0.5mn/r_n)\sin \eta + (0.5mn/r_n)^2 \sin(2\eta)$ $\epsilon = \theta - 0.5\eta z_F/z_c$ $x_N = (r_n + mn \cdot \cos(2\theta))\sin \epsilon$ $y_N = r_n + mn - \{r_n + mn \cdot \cos(2\theta)\}\cos \epsilon$

* * * * *